Patented Dec. 6, 1927.

1,651,461

UNITED STATES PATENT OFFICE.

MAX KUGEL, OF LEVERKUSEN, NEAR COLOGNE, GERMANY, ASSIGNOR TO GRASSELLI DYESTUFF CORPORATION, OF NEW YORK, N. Y., A CORPORATION OF DELAWARE.

VAT DYESTUFFS OF THE ANTHRAQUINONE SERIES.

No Drawing. Application filed March 23, 1925, Serial No. 17,839, and in Germany March 31, 1924.

My invention consists in new vat dyestuffs of the anthraquinone series.

These new products are characterized by their chemical constitution as being alpha aroyl substituted dianthraquinone-amids of di-basic carboxylic acids.

The general constitution of this type of compounds can be represented by the formula:

$$X-C_{14}H_6O_2-NH-R-NH-C_{14}H_6O_2-Y$$

in which X stands for an aroylamino group, Y stands for an aroylamino group or hydrogen and R stands for the radical of a dibasic carboxylic acid, as for instance —CO— carbonic acid; —CO—CO— oxalic acid; —CO—CH$_2$—CO— malonic acid; —CO—C$_2$H$_4$—CO— succinic acid; —CO—C$_4$H$_8$—CO— adipic acid; —CO—C$_6$H$_4$—CO— terephthalic acid, etc. The carboxylamid group can be linked to the anthraquinone nucleus indifferently in alpha or beta-position.

The aroylamino group X is however, in my invention always affixed to an alpha position. It can itself be substituted by halogen, or by acidyl amino, alkyl, aryl, oxy-alkyl, oxy-aryl, etc. groups. My invention relates to mono-alpha-aroyl-amid substituted anthraquinone amids as well as to products in which two or more aroyl amino groups are contained in the di-anthraquinone acid diamid molecule.

My new products can be easily reduced to form vats from which vegetable fibers are dyed exceedingly fast and deep bright shades, ranging from yellow over orange to red.

These alpha-aroyl-amino-di-anthraquinone amids of dibasic carboxylic acids can be obtained in different ways. The anthraquinone acid amids, as for instance, di-alphaanthraquinonyl urea

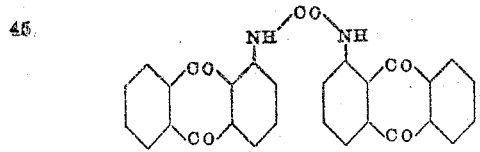

di-beta-anthraquinonyl urea

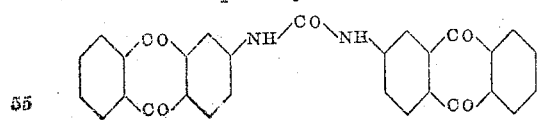

di-alpha-anthraquinonyl-succin-diamid

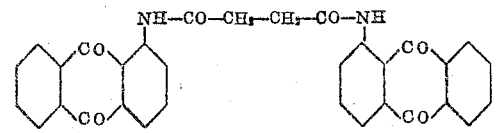

can be nitrated in solution of sulfuric acid. The nitro group enters in an alpha position of the anthraquinone nucleus. It is then reduced to the amino group and this latter aroylated as for instance with benzoyl chloride.

It is further possible to condense alphanitro-amino-anthraquinones with dibasic carboxylic acids or their derivatives such as the anhydrids, or chlorides. The carboxylic acids react with the amino groups to form acid amids substituted by nitro anthraquinone residue. The nitro groups are then reduced and the resulting amino groups treated with an acylchloride to form the aroylamino groups.

My preferred process is, however, to condense alpha-aroylamino-amino-anthraquinones with dibasic acid compounds or their derivatives, such as the free acids, the acid anhydrids, the acid halogenids, etc. When using the acids or their anhydrids the reaction is effected by adding a dehydrating agent or a phosphorous halogenid, thionylchloride, etc. When using the acyl halogenids no condensation agent is usually required and this method is especially adapted for the production of the substituted carbonic acid amids, or ureas. Mixed alphaaroylamino-dianthraquinone-diamids of dibasic carboxylic acids are, for instance, obtained by condensing an alpha-aroylaminoanthraquinone-mono-amid of a dibasic carboxylic acid with an amino-anthraquinone:

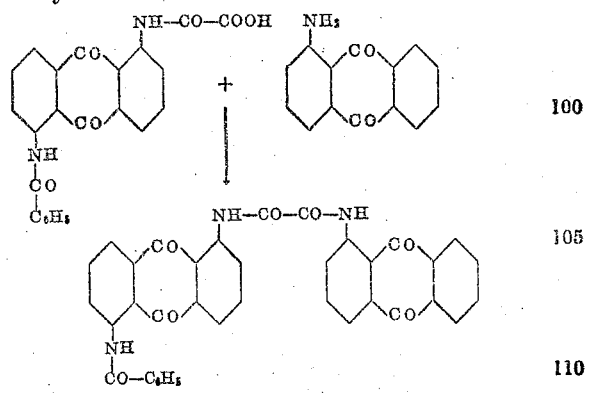

It is also possible to condense first an alpha-aroylamino-amino-anthraquinone with one molecular proportion of an acid dichloride at low temperature. The acyl chloride reacts only with one of its chlorine atoms. If a second, different alpha-aroylamino-amino-anthraquinone is added at a somewhat higher temperature; this will react with the second chlorine atom of the acyl chloride, as for instance,

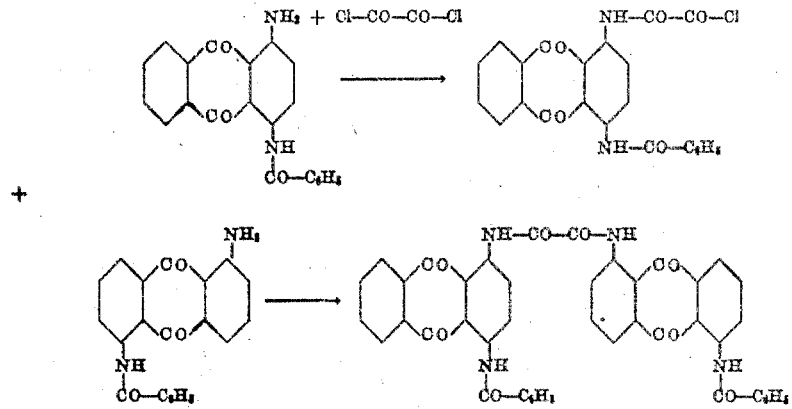

In order to further illustrate my invention, the following examples are given, the parts being by weight.

Example 1.—68.4 parts of 2-amino-4-benzoyl-aminoanthraquinone are suspended in 1000 parts of nitrobenzol and heated to 80–90° C. At this temperature 9.9 parts of phosgen are introduced while stirring. The temperature of the reaction mass is increased to 110° C. and kept at this point until no more of the dyestuff is produced. The very difficultly soluble reaction product is filtered hot, washed on the filter with nitrobenzol and alcohol. The so obtained 4.4′-dibenzoylamino-2.2′-dianthraquinonylurea

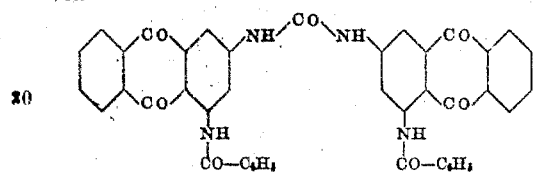

is a yellow powder, soluble in concentrated sulfuric acid with a bluish-red color; with sodium hydrosulfite in alkaline solution a Bordeaux red vat is obtained from which cotton is dyed reddish yellow shades.

Example 2.—68.4 parts of 1-amino-4-benzoylamino-anthraquinone are heated in suspension of 1000 parts nitrobenzol to 70° C. and 12.7 parts oxalylchloride slowly added. The reaction mass thickens quickly and under good stirring the temperature is brought to 110 to 115° C. and kept there until no more amino-benzoylamino-anthraquinone can be detected. The dyestuff separates as a fine crystalline, very difficultly soluble mass; it is filtered off hot, washed out first with nitrobenzol, then alcohol and finally with water. The so obtained product has most probably the formula:

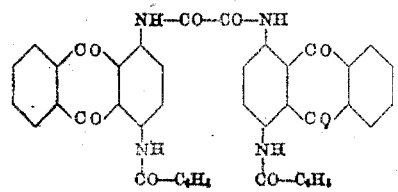

and it might be termed a 4.4′-dibenzoylaminoanthraquinone-1.1′-oxalyldiamid. It is soluble in concentrated sulfuric acid with a red color and gives a dull bluish vat from which vegetable fibers are dyed a bright, strong, and fast orange.

Example 3.—68.4 parts 1-amino-5-benzoyl-amino-anthraquinone are heated to 70° C. in a suspension of 1000 parts nitrobenzol, to which 12.7 parts oxalylchloride are slowly added. The reaction mass becomes rapidly thick. While stirring violently the temperature is brought up to 110–115° C. and kept there until no more 1-amino-5-benzoylaminoanthraquinone can be detected. The dyestuff formed separates as a very difficultly soluble yellow crystalline powder. It is filtered off hot, washed with nitrobenzol, alcohol and water. The so obtained 5.5′-dibenzoylaminoanthraquinone-1.1′-oxalyldiamid has most probably the formula:

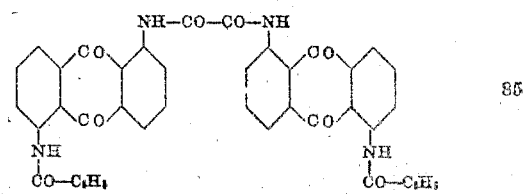

It is soluble in concentrated sulfuric acid with a dull reddish brown color. With sodium hydrosulfite in alkaline solution a dull bluish vat is obtained from which cotton is dyed an exceedingly bright and fast yellow.

*Example 4.*—32.4 parts 1-amino-4-benzoylaminoanthraquinone are suspended in 1000 parts nitrobenzol, heated to 70° C. and 15.5 parts succinylchloride slowly added. After 20–30 minutes stirring 34.2 parts 1-amino-5-benzoylaminoanthraquinone are added and the second step of the condensation finished at 110° C., i. e., until all the 1.5-amino-benzoylaminoanthraquinone has reacted. The dyestuff formed is filtered off, washed with nitrobenzol, alcohol and water. It is most probably the 4.5′-dibenzoylaminoanthraquinone-1.1′-succinyldiamid of the formula:

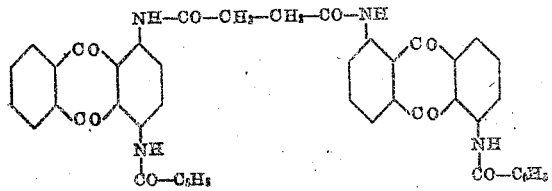

It is a red powder, soluble in concentrated sulfuric acid with a red color; it gives a Bordeaux red vat from which cotton is dyed fast, brilliant brick-red shades.

*Example 5.*—29.5 parts 1-anthraquinone-oxaminic acid

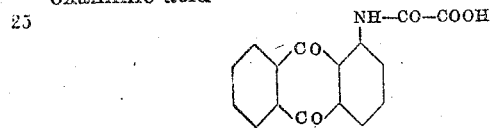

and 34.2 parts 1-amino-4-benzoylaminoanthraquinone are suspended in 1000 parts nitrobenzol, heated to 80° C. and 15 parts phosphoruspentachloride added. The reaction is finished at 110–115° C. The dyestuff is isolated by filtering, washing and drying. It is the 4-benzoylamino-dianthraquinonyl-1.1′-oxalyldiamid, having most probably the formula:

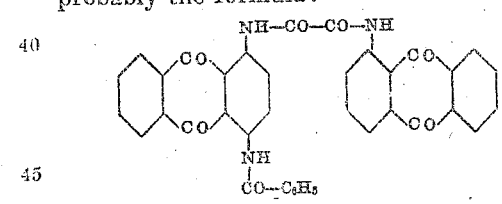

It is a reddish powder, soluble in concentrated sulfuric acid with a brownish-red color and gives a dull reddish-blue vat from which vegetable fibers are dyed fast orange shades.

*Example 6.*—50 parts dianthraquinonyl-1.1′-dioxamid

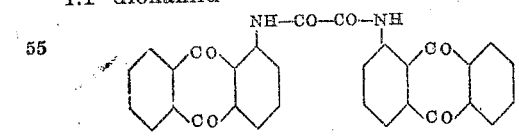

are suspended in 500 parts concentrated sulfuric acid 66° Bé. and at about 15° C. 16.5 parts nitric acid 45° Bé. slowly added. The nitration is carried out at 15–20° C. for several hours. The nitrocompound is very difficultly soluble in concentrated sulfuric acid, it is filtered over asbestos and washed to neutrality. It is then suspended in 5000 parts of water and reduced at about 85° C. with 300 parts sodium hydrosulfide solution containing an equivalent of 18 per cent hydrogen sulfide. The dark brownish reduction product separates, it is filtered off, washed out and dried. The so obtained amino compound is suspended in 500 parts nitrobenzol and treated at 145° C. with 32 parts benzoylchloride. The product obtained is identical with the 4.4′-dibenzoyl-aminoanthraquinone-1.1′-oxalyldiamid described in Example 2.

I claim:—

1. The process of producing alpha-aroyl-amino-dianthraquinone-diamids of dibasic carboxylic acids which comprises treating alpha - aroylamino - aminoanthraquinones with derivatives of dibasic carboxylic acids which are capable of reacting with the amino groups of the alpha-aroyl-amino-aminoanthraquinones.

2. The process of producing alpha-aroylamino-dianthraquinone-diamids of di-basic carboxylic acids which comprises treating alpha-aroylamino-aminoanthraquinones with the chlorides of dibasic carboxylic acids.

3. The process of producing alpha-benzoylamino-dianthraquinone-diamids of dibasic carboxylic acids which comprises treating alpha-benzoylamino-aminoanthraquinones with the chlorides of dibasic carboxylic acids.

4. The process of producing 5.5′-dibenzoylamino - dianthraquinone - 1.1′ - oxalyldiamid which comprises condensing 1-amino-5-benzoylaminoanthraquinone with oxalylchloride.

5. As new products alpha-aroylamino-dianthraquinone-diamids of dibasic carboxylic acids having the general formula

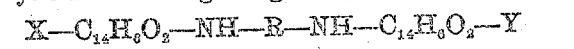

in which X stands for an aroylamino group, Y stands for an aroylamino group or hydrogen and R stands for the radical of a dibasic carboxylic acid, which products are generally yellow to dark red powders, very difficultly soluble in organic solvents, soluble in concentrated sulfuric acid with from red to brown colors, giving with reducing agents bluish vats from which cotton, after oxidation, is dyed from yellow to orange to red fast shades.

6. As new products alpha-aroylamino-dianthraquinone-diamids of dibasic carboxylic acids having the general formula

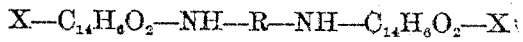

in which X stands for an aroylamino group and R stands for the radical of a dibasic carboxylic acid, which products are generally yellow to dark red powders, very difficultly soluble in organic solvents, soluble in concentrated sulfuric acid with from red to brown colors, giving with reducing agents bluish vats from which cotton, after oxidation, is dyed from yellow to orange to red fast shades.

7. As new products di-alpha-benzoylamino-dianthraquinone diamids of dibasic carboxylic acids having the general formula

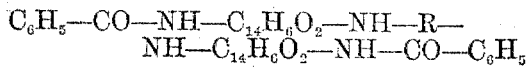

in which R stands for the radical of a dibasic carboxylic acid, which products are generally yellow to dark red powders, very difficultly soluble in organic solvents soluble in concentrated sulfuric acid with from red to brown colors, giving with reducing agents bluish vats from which cotton, after oxidation, is dyed from yellow to orange to red fast shades.

8. As a new product 5.5'-dibenzoylamino-dianthraquinone-1.1'-oxalyldiamid having most probably the following formula

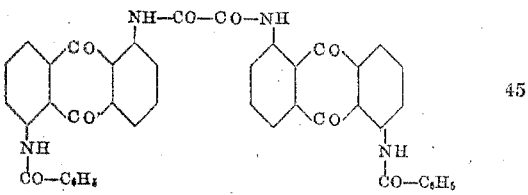

which product is a yellow, crystalline powder, very difficultly soluble in nitrobenzol and alcohol, soluble in concentrated sulfuric acid with a dull brownish-red color, giving with sodium hydrosulfite a dull bluish vat, from which cotton, after oxidation, is dyed bright yellow shades of excellent fastness.

In testimony whereof I have hereunto set my hand.

MAX KUGEL.